United States Patent

[11] 3,575,558

[72] Inventors Derek Leyburn
St. Laurent, Quebec;
David Johnston Horton, Baie D'urf, Quebec;
Edward G. F. Baker, Roxborough,
Quebec; Claude Lemieux, St. Bruno,
Quebec, Canada

[21] Appl. No. 754,522
[22] Filed July 26, 1968
[45] Patented Apr. 20, 1971
[73] Assignee Bell Canada
Montreal, Quebec, Canada
[32] Priority July 4, 1968
[33] Canada
[31] 024,220

[54] TELEPHONE PAGING SYSTEM AND METHOD
7 Claims, 4 Drawing Figs.

[52] U.S. Cl. ........................................................ 179/41, 325/55
[51] Int. Cl. ........................................................ H04q 7/00
[50] Field of Search ........................................... 340/311, 312; 179/2 (RS), 41 (A), 18.04; 325/64, 55

[56] References Cited

UNITED STATES PATENTS

| | | | |
|---|---|---|---|
| 2,259,316 | 10/1941 | Lyle ............................ | 325/64 |
| 2,985,719 | 5/1961 | Becker ......................... | 179/18 |
| 3,041,402 | 6/1962 | Dimmer ....................... | 179/41 |

*Primary Examiner*—Kathleen H. Claffy
*Assistant Examiner*—Douglas W. Olms
*Attorney*—Westell and Hanley

ABSTRACT: A telephone system and radio paging transmitters are combined by using dialed assigned telephone numbers to cause an information storage device to indicate radio paging areas corresponding to the dialed assigned number and, through the telephone system, to cause actuation of radio paging transmitters serving the radio paging areas to transmit a predetermined radio signal associated with the dialed assigned number. In some cases this will include a first information storage device, connecting itself to other information storage devices in order to achieve the connection to all the radio paging areas involved. Voice communication may also be provided for between the dialling party and the bearer of a radio paging receiver corresponding to an actuated paging transmitter.

INVENTORS
DEREK LEYBURN
DAVID J. HORTON
EDWARD G.F. BAKER
CLAUDE LEMIEUX
BY: Westell & Hanley INVENTORS
DEREK LEYBURN
DAVID J. HORTON
EDWARD G. F. BAKER
CLAUDE LEMIEUX
BY: Westell & Hanley INVENTORS
DEREK LEYBURN
DAVID J. HORTON
EDWARD G. F. BAKER
CLAUDE LEMIEUX
BY: Westell & Hanley INVENTORS
DEREK LEYBURN
DAVID J. HORTON
EDWARD G. F. BAKER
CLAUDE LEMIEUX
BY: Westell & Hanley

TELEPHONE PAGING SYSTEM AND METHOD

This invention relates to a telephone paging system wherein a telephone subscriber is provided, when away from his telephone, with a radio, herein called a 'paging' receiver which he carries on or near his person. The receiver is designed, in cooperation with the associated telephone system and a transmitter connected thereto so that when a paging number is dialled into the system a sensible (usually audible) signal which is intended to inform the subscriber that he is to phone a prearranged location (usually his headquarters or office) is provided. The paging receiver is usually designed so that once energized, it will continue to emit the alarm until the subscriber turns it off. Thus the broadcast signal may be of short duration. It will be appreciated that the transmitter has a localized area where it may be received and that, within this area, a transmitter signal will be provided corresponding to each paging subscriber and each paging subscriber has a receiver responsive only to one of the transmitter signals.

The transmitter-paging receiver connection may be achieved in any desired manner which allows the transmitter to be controlled to emit a signal which will actuate one, and only one, paging receiver, and on the other hand, where the transmitter is controllable to emit as many of such signals as there are paging subscribers in the area covered by the transmitter. In a preferred but well-known form of signalling, the transmitter is designed, and controlled, to emit successive preferably decimal digits represented by tones between 126 Hz. and 2200 Hz. modulated on a 35, 150 or a 450 megahertz carrier. Each paging receiver is designed to respond to a unique sequence of such digits to become activated to emit a sensible tone. The paging receiver is designed so that, once energized, it will emit a sensible (usually audible) alarm until turned off by the possessor of the receiver. Thus the transmitter signal need only be sent once. The number of digits sent by the transmitter to uniquely energize a reciever will, of course, depend on the number of receivers in a paging area.

By use of the term 'dialling', 'dialled' or 'dial' in this application and in the claims, I refer to the electrical signals transmitted through the telephone system rather than to the manual act and thus I refer not only, on the one hand, to pulses produced by the conventional telephone dial but also to tones indicative of digits as in the 'TOUCH-TONE' system but to electrical signals of any kind carried on telephone lines and indicative of telephone number digits, while on the other hand, the term includes similar signals produced by automatic and/ or electrical apparatus (such as an automatic calling unit) without manual initiation.

Present forms of such paging systems have however suffered from the disadvantage that each transmitter had a separate telephone number and each localized area required a separate paging call by the calling party.

The same telephone number could not be assigned to various areas since these would, in accord with the overall telephone system operation, require different numbers. In other words, in the prior art a separate paging system was required for each city. These separate systems were not interconnectable as far as a subscriber was concerned and a subscriber was therefore confined to paging service within one city only. To page a subscriber in more than one city, a unique telephone number was required for each city involved. This would have been time consuming and would have resulted in excessive use of the switching network. Thus the use of a paging system was effectively limited to large metropolitan areas.

This invention provides a paging system for connection to a conventional telephone system wherein subscribers to the paging service are provided with telephone numbers which may be dialed into the conventional system for switching and transmission as any other telephone number. Such paging subscribers numbers are herein referred to as 'paging access numbers.' A storage center usually a computer is connectable to the telephone system for connection on the dialling of an earlier subset of dialled digits of the set consisting of the digits in said paging access number. The storage center is designed when connected to recognize (or not) a later subset of the set as identifying (or not) a paging subscriber. If such identification exists, the storage means is designed to provide information in digital form of the transmitter areas where that particular paging subscriber requires service. The storage center is associated with means responsive to said information to dial the number of the transmitters corresponding to areas designated by the called subscriber, directly associated with the storage center, and to provide thereto information characteristic of the called subscriber. The transmitters are designed (as the present ones are also) to provide on connection by their dialled number followed by signals characteristic of the subscriber to transmit the signal for which the subscriber's set is tuned. In addition to a plurality of transmitters associated with a storage center (usually representing adjacent parts of a metropolitan area or adjacent cities etc.) the system envisages transmitters associated with other storage centers which respectively will have other telephone systems associated therewith and the system envisages that some subscribers will subscribe for paging in areas associated with a second or other storage centers. A paging call will reach the first storage center and on receipt of the paging number the storage center will call all its associated transmitters for which the subscriber has applied and provide them with information identifying the subscriber; but will also dial through the telephone system to connect itself therethrough to other storage centers associated with other transmitter areas in which the subscriber has requested paging service. The other storage centers, on being called, are provided with a paging access number and by consultation of their records associated with such paging number, will actuate their relevant associated transmitters. The paging access number supplied to a second storage center by the first may not use the same subscriber identifying digits as the first since all that is important is that the digits supplied to the second storage center are such as to cause its transmitters to call the same subscriber's paging set. Thus, with the novel system, the dialing of the number of a single paging subscriber will cause, through the use of the telephone system, radio transmitted paging numbers to be sent out in any area of the system which the subscriber has designated.

The inventive method and apparatus lend themselves to the further advantage that paging calls involving use of the toll switching network between two centers may be delayed for a predetermined period or until a predetermined number for transmission between two centers is collected or a certain time has elapsed whichever period is shorter and sent all at once with a single use of the toll switching network.

It will be noted that the areas which may be reached through original dialling of a single paging access number using the methods of the invention are as extensive as the telephone system and thus within the system a subscriber could be provided with paging along commercial air, road, rail and water routes.

In drawings which illustrate a preferred embodiment of the invention:

Figure 1:
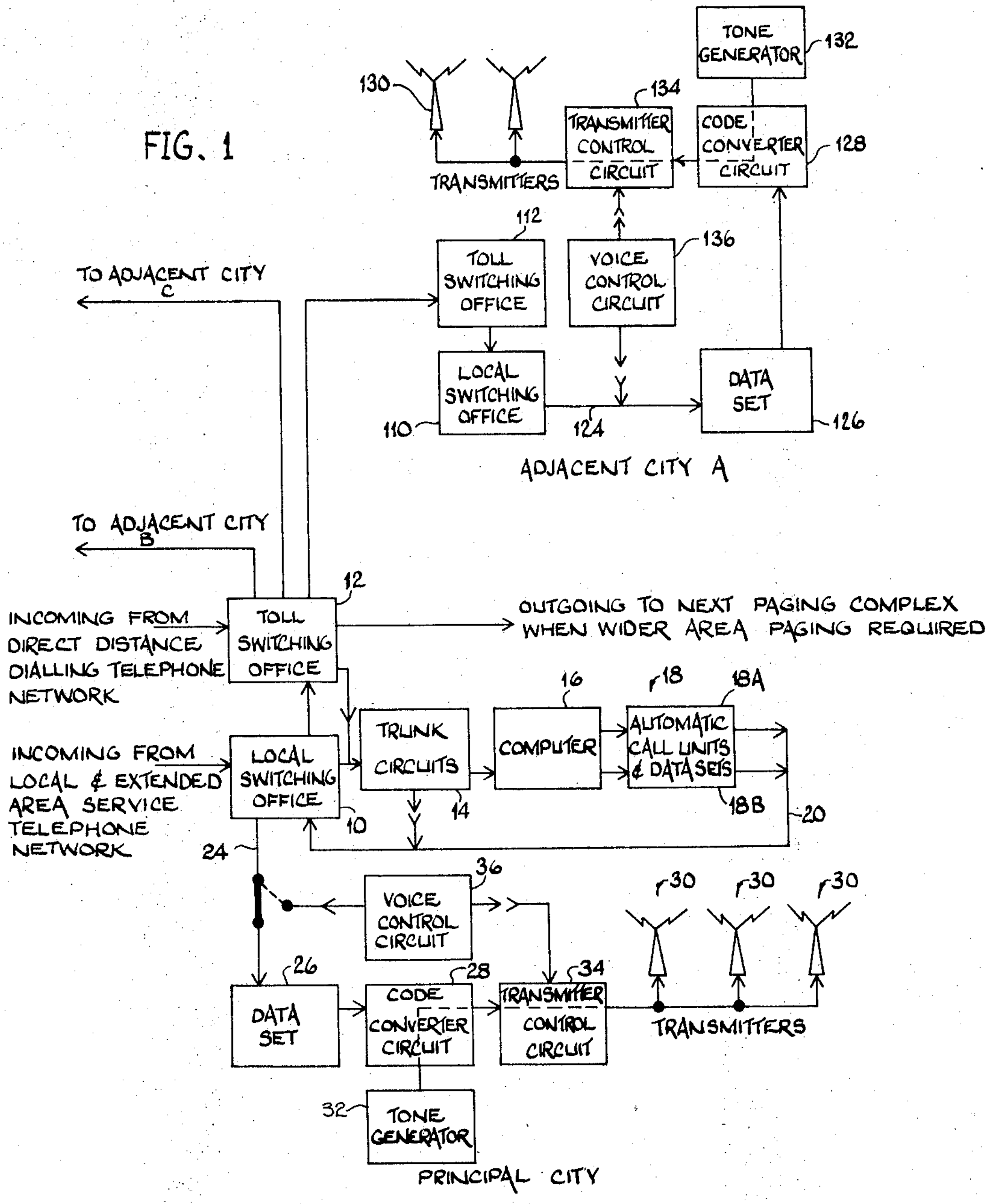
FIG. 1 shows a block diagram of a system in accord with the invention.

IN FIG. 1 is shown a local switching office 10 for handling telephone calls between subscribers in local calling areas, and the local switching office may be of any desired conventional form. It will be noted that in accord with the invention local and toll switching offices of different types may be operated by the same storage center which is easily programmed to send dial signals operable by the switching office it is calling.

Connected to the local switching office 10 for transmitting long distance calls thereto and therefrom is a toll switching office 12. Elements such as the switching offices 10 and 12 are, of course, part of a conventional telephone system and handle normal as well as paging telephone calls. The toll switching office also may be of any conventional form well known in the telephone switching art. It should be noted here that, included with its normal connections to various long distance points relative to the local switching office served by 10, are connections to adjacent cities or areas A, B and C.

The local switching office 10 and the toll switching office 12 are connected through a trunk circuit 14 (to be later described) to a storage center comprising computer 16. The local switching office 10 and the toll switching office 12 are connectable through the trunk circuit 14 back to local switching office 10.

The computer 16 may be of any desired form suitable for the storage and retrieval of information. Examples of preferred and available computer types are the 'P.D.P.8. ' manufactured by Computing Devices of Canada Limited, 59 Richmond Street East, Toronto, Canada, or the 'Univac 418' manufactured by the Univac Division of Sperry Rand of Canada Limited, 984 Bay Street, Toronto, Canada. However the functions required of the computer in the application are conventional and are available in many computers other than those named.

The computer is connected to control an automatic call until 18A and data set 18B. The automatic call unit portion of the device is designed, on request, to place dialling signals on an output telephone line 20. The data set portion of this device is designed, on request, to place information on telephone line 20 as supplied by the computer in a form usable by a device connected to the telephone system to which it has been connected by the dialing of call unit 18A. The automatic call unit 18A and the data set 18B may each be of any of a number of designs available to those skilled in the art but it is preferred to use for the automatic call unit—data auxiliary set 801C, Data set —Data set 401E.

The models for the automatic call unit and the data set specified are both manufactured by American Telephone and Telegraph Company, 195 Broadway, New York, N.Y., 10007.

The trunk circuit 14 also has an output connectable to line 20.

Line 20 fed by the automatic calling unit, and data set 18 and selectively by trunk circuit 14 is connected into the local switching office 10. Thus the line 20 may be connected by the local switching office 10 in accord with numbers 'dialled' by the automatic calling unit 18. These numbers in a wide area system will fall into three classes, a. through the local switching office to a transmitter associated with the local switching office 10,
b. through the local and the toll switching office to a transmitter or transmitter associated with a local switching office similar to 10 which is associated with the same computer 16,
c. through the local and the toll switching office to a computer similar to computer 16 having one or more transmitters associated therewith.

However, it will be appreciated that the invention applies to systems which have less than all of these alternatives.

Continuing with the specific embodiment those elements associated with class (a) will now be described.

An output line 24 from the switching office 18 is connected to a data set 26. This data set 26 has an inverse operation from data set 18B which was designed to accept encoded information from computer 16 and to convert this to a form suitable for transmission through the telephone system. The data set 26 is designed to accept signals suitable for the telephone wires and to convert these signals into a form suitable for use by a succeeding apparatus. The data set 26 may be embodied in any form suitable and available. However, it is preferred to use for this purpose data set 401J manufactured by American Telephone and Telegraph Company whose address has been previously set out.

The output of data set 26 is connected to the code converter 28. Transmitters 30 are controlled in accord with tones supplied by a tone generator 32 to a transmitter control circuit 34 whose output is connected to transmitters 30. Preferably a plurality of tones is made available by the tone generator 32 and one or more of such tones are selectively provided to the transmitter control circuit 34 where the selected tones, in accord with techniques well known to those skilled in the art cause the transmitter control circuit 34 to determined the transmitter 30 output frequencies. The tone generator 32 making available the necessary selection of tones is connected to the transmitter control circuit 34 through the code converter circuit 28. The function of code converter 28 is to select the tones for the generator 32 to be applied to transmitter control circuit 34. The code converter 28 will be hereinafter described. The tone generator 32 may be of any of a number of types well known to those skilled in the art and compatible in available tones with the transmitter control circuit 34 and code converter 28.

Similarly the transmitter 30 and control circuit 34 may be of any known type compatible with the tone generator and code converter. The preferred tone generator, transmitter and control circuit are embodied in the Bogen Type B-250-VA4 radio transmitter with power modulation, monitor and trunk terminal panel manufactured by Bogen Communications Division of Lear Siegler Incorporated, New Jersey U.S.A.

Connectable between the local switching office 10 and transmitter control circuit 34 is optionally provided a voice control circuit 36.

Toll switching office 12 is, in this embodiment, connected to a number of adjacent cities or transmitter areas, here designated cities A, B and C. The arrangement of the system at each of these locations is the same and connection to city A will only be described.

Circuits similar to circuits previously discussed are assigned numbers with 100 added to their corresponding circuit already discussed.

Toll switching office 12 is connected to toll switching office 112 in the adjacent city. Toll switching office 112 is connected to local switching office 110. Local switching office 110 is connected through data set 126 along line 124 to code converter circuit 128. Code converter circuit 128 is designed to act in accord with signals received from data set 126 to select the tones available from a tone generator 132 which are to be applied to transmitter control circuit 134. A voice control circuit 136 is optionally connectable between local switching office 110 and transmitter control circuit 134.

The computer is programmed to store the values of a selected subset of digits from the set comprising each paging access number and characteristic of such paging access number and to store in association therewith information as to the paging areas designed by the subscriber associated with the paging access number. The computer is programmed to receive signals representing values which might correspond to the stored digit value, and on determining whether such correspondence does or does not exist to send out a signal as to whether such correspondence exists or not. The computer is programmed, on determining such correspondence to provide for use in the telephone system, information sufficient to cause connection through the normal telephone system of the computer (local area) or another computer (wide area) to each transmitter for an area designated by the subscriber, and on achieving said connection the computer so connected will provide, along said connection, control signals to cause the designated transmitter to broadcast the subscriber's paging signals.

In operation, with the system as shown in FIG. 1 (and noting that three of the circuits discussed are still to be described in detail) the receipt of a paging access number from a local calling point at local switching office 10 or the receipt of a paging access number from a remote calling point at the toll switching office 12, in either event causes the office 10 or 12 to seize a trunk circuit 14 and thereby to achieve connection to the computer 16. On this being achieved the required number of digits from the paging access number is supplied to the computer and the computer determines whether or not there is a paging access number in its store corresponding to the digits received and sends a 'call accepted' or a 'call not accepted' signal, in accord with such determination, to the calling party.

In either event, unless the calling party desires voice communication, as hereinafter described, he may hang up. If the call is accepted, indicating that the digits received by the computer correspond to a set stored by the computer, then the computer determines the transmitter area or areas corresponding to the digits, in other words the paging access areas designated by the subscriber whose paging access number contains the recognized digits. The computer then causes the automatic call unit 18A to dial through the conventional telephone system the transmitters corresponding to the area designated. With each transmitter dialled, the automatic call unit achieves connection through the local switching office along line 20 to the data set 26 or 126 corresponding to the transmitter dialled. Thus the transmitter may be local, corresponding to data set 26 or may be remote in which case the automatic call unit 18A is instructed by the computer 16 to connect through the telephone system through office 10 and 12 to a remote data set for example data set 126. The automatic call unit may also call a computer similar to computer 16 for another part of the system, but this will be described hereafter. Calls to data set 26 are executed immediately. Calls passing through the toll office may for a given destination be stored by the computer until a predetermined number are received or a certain time elapses (whichever first occurs) and then forwarded by a single dialling procedure, thus reducing volume of calls through the toll switching network. Since the operations associated with data set 26 and data set 126 are similar, the operation associated with data set 26, only, will be described.

When connection is achieved by the automatic calling unit 18A to data set 26 in accord with the well-known and commercially available design the data set signals the fact back to the computer.

The computer then disconnects the calling unit and connects the data set 18B to line 20 and provides signals characteristic of the values of the selected digits from the subscriber's number. Data set 26 converts the signals received into other signals also characteristic of the subscriber and suitable for the functions of the code converter unit. The code converter unit (to be described) acts as a gate (in accord with the subscriber characteristic signals it receives from the data set 26) to determine the tone signals supplied to the transmitter control unit 34. Thus with the tone signals also characteristic of the subscriber, the transmitter sends out a paging signal to actuate the subscriber's set and let him know that he is being paged. Where acknowledgement is to be provided by the subscriber (an optional feature and a well-known technique prior to this invention) it will be obvious that the subscriber may transmit back acknowledgement which will be received by the transmitter and means may conveniently be provided for relaying an acknowledgement signal back into the line 24 for forwarding to the calling party. Where voice communication is desired, means are provided for connecting a voice control circuit between local switching office 10 and the transmitter control circuit 34. As hereinafter described in detail such connection is obtained by the caller maintaining the connection, after receiving from trunk circuit 14 the 'call accepted' signal and the computer' s determination that voice communication is required by such paging access number. With the desire for voice connection so indicated:

a. Once the automatic call unit 18A and data set 18B have completed their function: computer 16, call unit 18A and data set 18B are disconnected from the trunk circuit, and the trunk circuit 14 is connected directly with line 20.

b. After data set 26 has received the paging information from data set 18B and relayed it to the code converter, data set 26 is disconnected from line 24 and voice control 36 is connected directly to the transmitter control circuit 34.

The transmitters 30, firing the voice communication, of course also act and are designed, for voice use, to act as receivers. The connection for voice in two directions between the transmitters 30 and voice control circuit 36 may be easily provided in accord with circuitry well known to those skilled in the art.

It will be appreciated that the lines between blocks in FIG. 1 do not necessarily represent single wires, and the number of leads will represent those conventionally required between known circuits together with those lines herein discussed.

It should be noted that where the number of subscribers associated with a single transmitter 30 is large enough, data set 18B may be directly connected to the data set 26 without passing through the conventional telephone system and without using the automatic calling unit. However even where this is done, the automatic calling unit and the conventional telephone system will still be used for connection of the data set 18B to other transmitters and/or other computers.

It should also be noted that, although not a preferred mode of operation, the automatic calling unit 18A may not only be used to achieve the connection to a data set 26 or 126 or a computer but may also be used to supply the subscriber characterizing digital information for the relevant transmitter or computer. In this alternative the data set receiving this information will be arranged to accept and process the digital information in the form received from the automatic calling unit.

It may also be of value to discuss an example of digital dialling designations used with the system. This is not intended to limit the scope of the invention but to assist in understanding the specific embodiment.

A paging access number will usually comprise a set of seven digits which may be appended to digital prefixes such as direct dialling or area codes.

The subset of the paging number set of digits will have a number of digits related to the number of paging subscribers whose records are stored at a computer. With 10 to 100 subscribers a subset comprising the last two digits will be sufficient to identify all subscribers. With 100—1000 and with 1000—10000 subscribers the subset must comprise the last three or last four digits respectively. With such subsets the computer will be connected to the system to be reached by normal telephone switching connections on the dialling of the subset comprising the remaining and preceding digits in the seven-figure number.

Thus if a subscriber has a paging access number 442—1967 and there are 9000 paging subscribers at the same computer 16 then the subset '1967' will identify the paging subscriber at the computer. The computer will then be connected to be reached in the telephone system by dialling the preceding subset '442'.

When the computer directs the automatic calling unit to call a data set 26 or 126 or another computer 16, the number dialled will be the ordinary telephone number for such data set 26 or 126 or a computer with area codes appended where required.

The information supplied to the data sets has been described. The information supplied to the other computer will be a subset of digits to reach the other computer and a subset of digits to identify at the second computer the subscriber originally paged at the first computer. It is noted that the following subset digits identifying the subscriber at the second computer may differ in number and value to those identifying the same subscriber at the first computer, as long as each computer, in response to the relevant subset is programmed, in response to the receipt thereof; to cause its transmitter to broadcast on the frequency to which the subscriber's paging receiver is tuned.

In the description to follow several relays and their contacts are described. A uniform method of designation is here used. The relay is designated by R and a digit. Its contacts are designated R and the digit with -1, -2, -3 and so on for the various sets of contacts. Thus R13 is a relay and R13-1, R13-2 and so on are contacts of the same relay.

Figure 2:
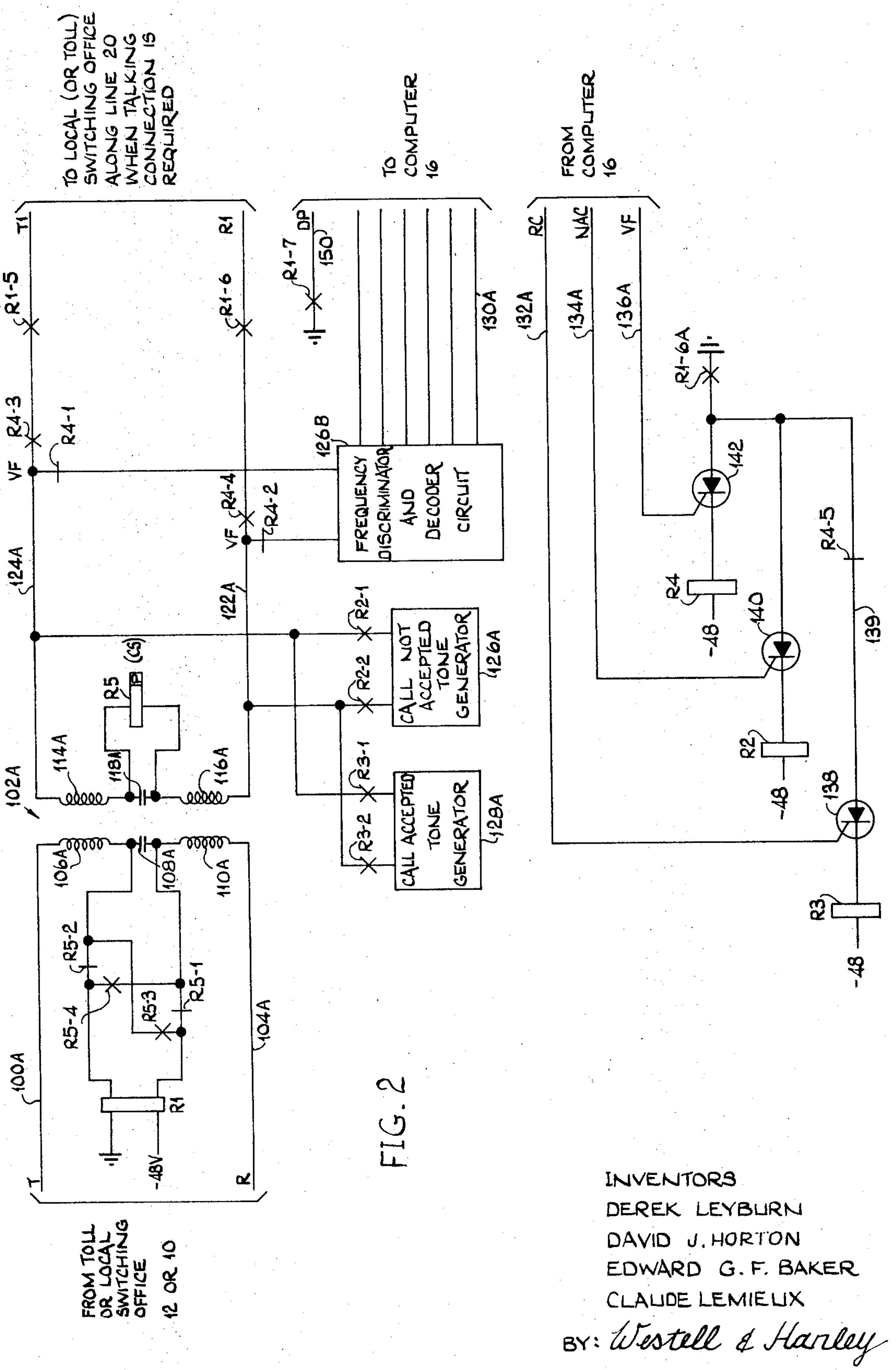
FIG. 2 shows a diagram of a trunk circuit shown as a block in FIG. 1.

In FIG. 2 is shown the detail of the trunk circuit in accord with the invention.

Tip line 100A from toll or local switching office 12 or 10 is connected across the primary of transformer 102 to ring lead 104A. The primary consists of coils 106A in series with condenser 108A and coil 110A, as shown. Ground supply is connected through one coil of high impedance relay R1 through normally closed contacts R5-2 and coil 106A to the line 100A. A —48v. supply is connected through the other coil of relay R1 and normally closed contacts R5-1 through coil 110A to line 104A. Normally open contacts R5-4 and R5-3 are connected to reverse the above connections between ground and the —48v. supply on the one hand and lines 100A and 104A on the other hand when R5-3 and R5-4 are closed and the contacts R5-1 and R5-2 are opened.

The output winding of transformer 102A connects tip and ring lines 124A and 122A comprises coils 114A and 116A connected in series with and on each side of condenser 118A. Connected in parallel with condenser 118A is a polarized relay R5. Lines 124A and 122A are connected to a 'call not accepted' tone generator 126A through the normally open contacts R2-1 and R2-2 respectively, of a relay R2. Lines 124A and 122A are connected to a 'call accepted' tone generator 128A through the normally open contacts R3-1 and R3-2 respectively of a relay R3.

Lines 124A and 122A are connected to input terminals of a frequency discriminator and decoder circuit 126B through the normally closed contacts R4-1 and R4-2 of a relay R4. Lines 124A and 122A are connectable respectively through the normally open contacts R4-3 and R4-4 of the relay R4 and then through normally open contacts R1-5 and R1-6 respectively to form the tip and ring inputs to the local switching office 10 along line 24.

The frequency discriminator decoder circuit 126B may take any form to accept at its input tones or frequencies transmitted representative of digits and to provide DC signals along lines 130A for the computer representative of such digits.

A ground is connected to the computer through normally open contacts R1-7.

Line 132A from the computer 16 is connected to the gate of an SCR138. Line 139 is connected from the anode of SCR138 through the normally closed contacts R4-5 of relay R4, in series through the normally open contacts R1-6 of relay R1 to ground. The cathode of SCR138 is connected to —48v. through relay R3.

Line 134A from the computer 16 is connected to the gate of a SCR140 and the anode of SCR140 is connected to ground through the normally open contacts R1-6. The cathode of SCR140 is connected to a —48 v. supply through relay R2.

Line 136A from the computer 16 is connected to the gate of an SCR142 and the anode of SCR142 is connected to ground through the normally open contacts R1-6A. The cathode of SCR142 is connected to a —48v. supply through relay R4.

In operation when a paging access call is made to computer 16, whichever of the toll or local office 12 or 10 is making the call completes, with normal telephone switching, a short across lines 100A and 104A energizing relay R1. This closes contacts R1-7 on lead 150. Lead 150 is connected in the computer on the closure of contacts R1-7 to indicate to the computer that a call is present and to be ready to receive the digits arriving on leads 100A and 104A. The toll or local switching office now provides the digital subset from the telephone access number to identify the subscriber at the computer. The mode of transmitting the digits may, in accord with conventional modes of signalling, be by pulse or tones. If pulse, these will appear on the trunk circuit as intermittent openings of relay R1. This will result in corresponding openings of contacts R1-7 whereby the corresponding pluses are supplied to the computer which thereupon may assemble the pulses and digits to form the required number. If the manner of signalling the required number from the switching office on the loads 100A and 104A is a series of frequencies (such, for example, as in multifrequency pulsing) these pass through transformer 102A and across contacts R4-2 and R4-1 to frequency discriminator and decoder circuit 126B which acts to provide the computer 16 along lines 130A with information as to the frequencies and hence the digits received. When the digital information has been supplied (whatever the method of sending the digital information) the computer is designed to compare these digits with subsets in storage to see if a corresponding subset of digits is in storage. If not, the computer supplies a gating pulse along line 134A to trigger SCR140 (contacts R1-6 being closed) and the resulting energization of relay R2 closes contacts R2-1 and R2-2 applying a 'call not accepted' tone through leads 122A and 124A to the leads 100A and 104A which may be noted by the calling party. If the computer finds a corresponding set of digits in storage it energizes lead 132A to supply a gating pulse to trigger the SCR138 energizing relay R3, closing contacts R3-1 and R3-2 and applying a 'call accepted' tone to lines 100A and 102A through leads 122A and 124A. It will be understood that the 'call accepted' and 'call not accepted' tones will be audibly different Whether the 'call accepted' or 'call not accepted' tone is sent, the caller may now disconnect, unless a voice connection is required. If the caller hangs up, the short across leads 100A and 104A is broken, R1 is deenergized and all R1 contacts return to their normal position. If a voice connection is required, the calling party maintains the connection. The computer on locating the corresponding set of digits in its storage will have a record that the subscriber corresponding to these digits requires voice connection and the computer will be programmed to energize lead 136A, turning on SCR142, energizing relay R4, R4-1, R4-2 and R4-5 now open disconnecting the frequency discriminator and decoder circuit 126B and turning off SCR138. Contacts R4-3 and R4-4 close, and R1-5 and R1-6 are already closed, making the connection between the toll deenergized local switching office 10 and the line 20 back to local switching office 10 and bypassing computer 16 and blocks 18A and 18B whose purpose has been served. It will be noted that if a second computer, called by the first computer is involved, similar circuitry will bypass said second computer for the voice connection. On connection of lines 122 and 124 to the switching office through line 20, a DC voltage is in accord with conventional practice, applied by office 10 to line 124A and 122A to energize polarized relay R5. This closes contacts R5-3 and R5-4 and opens contacts R5-1 and R5-2 to reverse the polarity of voltage applied by the —48v. supply to lines 100A and 104A. This is not directly related to the purposes of this invention, but provides the actuation to calculate the toll charge for the voice call in a charge situation.

When the call is completed, the calling party disconnects and this causes release of relay R1 opening contacts R1-6A and disconnecting SCR142. When SCR142 turns off relay R4 is deenergized and R4-3 and R4-4 open, disconnecting lines 122A and 124A from line 24 while R4-1 and R4-2 and R4-5 close, reconnecting lines 124A and 122A with the frequency discriminator and decoder circuit 126B and connecting the anode of SCR138 to contacts R1-6A.

Figure 3:
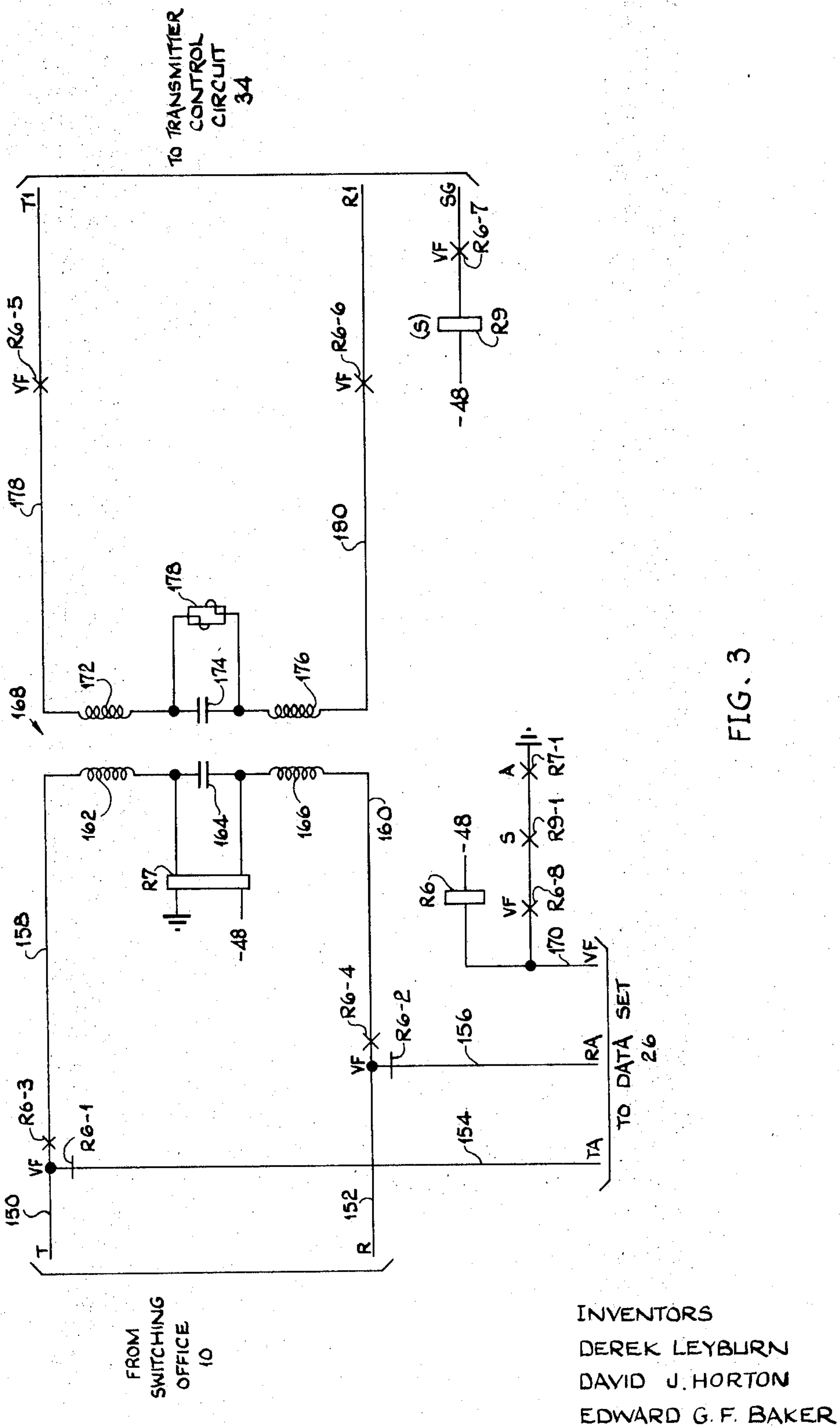
FIG. 3 shows a diagram of a voice control circuit shown as a block in FIG. 1.

In FIG. 3 is shown the voice control circuit which provides the interface or impedance and power matching during a voice connection between local switching office 10, and transmitter control circuit 34. This must be considered as optional equipment since as will be obvious, a paging system may be operated in accord with the invention without the voice communication feature. Referring back to FIG. 2, shortly, if the voice communication feature is omitted, then the voice frequency elements R5, R4, their contacts and SCR142 would not be used.

Relating to FIG. 3, it will be seen that lines 150 and 152 represent the tip and ring leads from switching office 10 to data set 26 and transmitter control circuit 34. Leads 150 and 152 are normally connected to the tip and ring leads 154 and 156 respectively through normally closed contacts R6-1 and R6-2 respectively of relay R6. Leads 150 and 152 are connectable to lines 158 and 160 to control circuit 34 through the normally open contacts R6-3 and R6-4 respectively, of relay R6. Line 158 is connected in series through one primary winding 162 of transformer 168, condenser 164, and the other primary winding 166 to line 160. A –48v. source is connected through one winding of high impedance relay R7 and in series through winding 166 to line 160. A ground is connected through the other winding of high impedance relay R7 and, in series, through primary winding 162 to line 158.

A line 170 from data set 26 is connected to –48v. through a relay R6. The junction between line 170 and relay R6 is connected to ground through normally open contacts R6-8, R9-1 and R7-1 in series. The secondary of transformer 168 comprises winding 172, condenser 174 and winding 176 in series between tip and ring lines 178 and 180 for connection to the transmitter control circuit 34. Connected in parallel with condenser 174 is a cored coil 178 for impedance matching of the connected parts of circuit 34 with the connected parts of circuit 10. LInes 178 and 180 were respectively connectable through normally open contacts R6-5 and R6-6 to transmitter control circuit 34. A –48v. source is connected through relay R9 and normally open contacts R6-7 in series to the transmitter control circuit.

The operation of the circuitry of FIG. 3 will now be discussed. When not in use, the circuitry is in the state illustrated in the drawings. When voice communication is required, with a paging call, the computer sends the required signal to data set 26 and data set 26 in accord with its design and means well known to those skilled in the art, applies a ground to line 170 energizing relay R6. Contacts R6-1 and R6-2 open disconnecting the data set. Contacts R6-3, -4, -5 and -6 close providing an alternating current connection between switching office 10 and transmitter control circuit 34. Contacts R6-7 and R6-8 also close. Switching office 10 supplies a short between lines 150 and 152 so that R7 is energized and contacts R7-1 close. The presence of the called party on the line causes, in accord with well-known design techniques the application of a ground at transmitter control circuit 34 in series with relay R9 and contacts R6-8 (now closed) to energize relay R9. Contacts R9-1 therefore close. With contacts R6-8, R9-1 and R7-1 closed R6 is locked in energized state. Lead 170 is deenergized at data set 26 conditional on the opening of contacts R6-1 and R6-2 but the deenergization of lead 170 is timed to take place after the closing of contacts R6-8, R9-1 and R7-1. The voice conversation now takes place bypassing data set 26 and code converter circuit 28. As will be appreciated transmitter 30 is provided, in accord with well-known techniques with means for applying voice communication along lines 178 and 180 to the transmitted signal and for providing voice signals to these lines from a received signal. The conversation may be terminated by the calling party hanging up. This removes the short between lines 150 and 152 and deenergizes relay R7, opening contacts R7-1, deenergizing relay R6, causing all the R6 contacts to assume their states shown in FIG. 3 and disconnecting the voice control circuit from switching office 10 and transmitter control circuit 34 and reconnecting the local switching office 10 to data set 26. The relay R9 will be deenergized and contacts R9-1 will open due to the opening of contacts R6-7.

When the called party hangs up, ground will be removed from the lead to contacts R6-7. If the called party hangs up first, therefore, relay R9 is deenergized, opening contacts R9-1 and deenergizing relay R6 with the operation of the R6 contacts discussed above.

Figure 4:
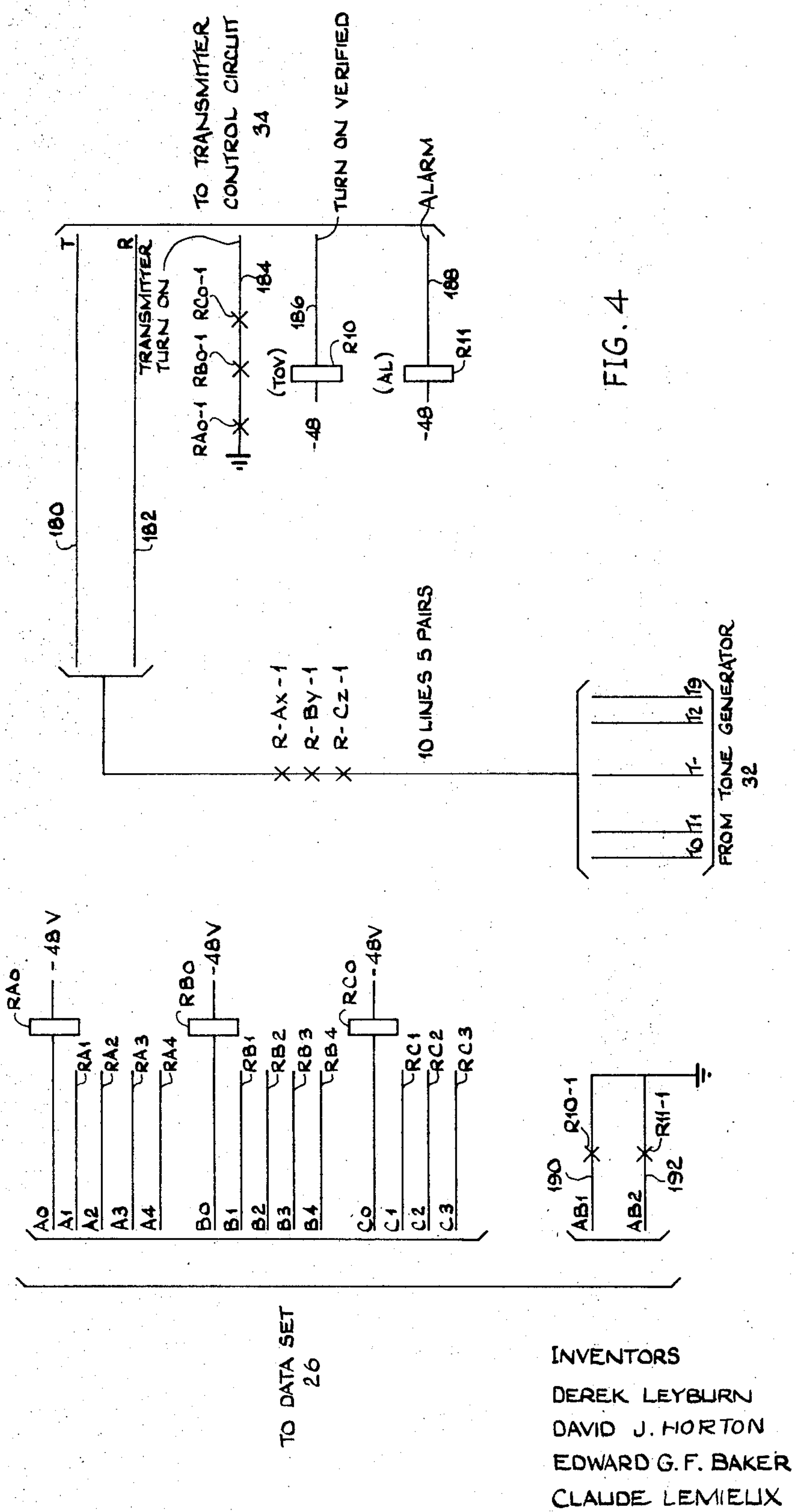
FIG. 4 shows a diagram of a code converter circuit shown as a block in FIG. 1.

In FIG. 4 is shown the code converter circuit 28. The code converter circuit 28 acts as a plurality of selectable gates to determine what tones or combination of tones available from tone generator 32 are supplied to transmitter control circuit 34, to cause the transmitter to transmit tones uniquely actuating paging receiver of the subscriber. Obviously the methods of using and selecting tones for this purpose are infinite. In the preferred form of the invention, decimal digits identifying the subscriber are sequentially signalled by the selected tones from the tone generator to the transmitter. Although this could be done by 10 separate tones, or various pair combinations of 7 tones (as in 'TOUCH TONE' dialling) it is preferred to provide 10 tones on lines T1 to T9 from tone generator 32 and to respectively represent the digits 0—9 by causing the closing of three RA*x*-1, RB*y*-1, RC*z*-1 to select the correct one of the 10 lines. In actual fact it is preferred to provide three lines and tones for each digit with the three tones for a digit being more similar to each other than to other tones. Thus 30 alternatives are provided. However 10 lines only are shown for brevity. There are therefore 10 pair of lines 'T' selectively connectable to tip and ring leads 181 and 182 of the circuit 34 by 10 different combinations of an A, B and C relay contact. A line 184 from transmitter control circuit 34 is connected through normally open contacts RC0-1, RB0-1 and RA0-1 to ground. A lead 186 from transmitter control circuit 34 is connected through relay R10 to –48v. A lead 188 from the transmitter control circuit 34 is connected to –48v. through relay R11. The data set 26 provides line 190 connected to ground through normally open contacts R10-1 and line 192 through normally open contacts R11-1. In accord with the normal design of the data sets 18 and 26 data set 26 is designed to operate a 3 in 14 binary code providing one 'on' or grounded state in: one of five lines A0 to A4, one of five lines B0 to B4 and one of four lines Co to C3 to represent a digit or other information. Each line is connected to –48v. through a relay RA, RB or a RC but of these relays only RA0, RB0 or RC0 are shown for brevity. The combination RA0, RB0 and RC0 when energized connect line 184 to ground. The 10 combinations of ABC contacts selectively close a line pair TO to T9 to indicate digits are not shown individually but are represented by the triplet RA*x*-1, RB*y*-1 and RC*z*-1.

In operation, when the data set 26 is directed to supply paging data to the transmitter control circuit it grounds a combination of A, B and C lines which is not to be used for digital representation. Here this combination has been selected as lines A0, B0, C0. Accordingly relays RA0, RB0 and RC0 are energized and the corresponding -1 contacts close applying a ground to lead 184 to transmitter control circuit 34. The transmitter control circuit 34 is designed to be turned on and in verification of this to apply a ground to line 186, energizing relay R10 and closing contacts R10-1. This is used to ground line 190 and indicate to the data set 26 that the subscriber identifying digital information may be sent. This is sent sequentially at a rate suitable to the data set 26, the transmitter control circuit 34 and the subscriber's receiver, say, information as to a digit for 0.25 seconds and a 0.1 second interval between digits. Thus the required number of digits is sent, with for each digit, a combination of RA, RB and RC, relays being energized and a different line pair and tone resultantly connected to lines 180–182. With the digital information the transmitter transmits the signals corresponding to the subscriber indicating digits.

It will be noted that for a single connection of data set 26 to control circuit 34 a number of sets of paging subscriber digits may be sent without the necessity of turning off and on the transmitter each time. When transmission to control circuit 34 is completed the transmitter is told by a special combination of A B & C relay contacts (not shown) of this fact and ground is removed from line 186 and R10-1 opens.

If during connection of the transmitter or during digit transmission, a trouble condition appears at the transmitter, the transmitter will apply a ground to line 188, energizing relay R11 and contacts R11-1 are closed connecting line 192 to ground. This may by well-known techniques, be relayed through data set 26 to the computer 16 to cause it to print a trouble report.

The number of digits supplied to transmitter control circuit 34 from data set 26 and the computer depends on the number of paging subscribers using the transmitter. If the number is between 100 —1000 three decimal digits will be transmitted, 1000 and 100000 four decimal digits 10000 and 100000 five digits.

We claim:

1. For use with a telephone system, having connected thereto a plurality of transmitter controls said controls each being connectable to a line in the system carrying a combination of subscriber dialed-type digits for establishing through the system, the connection thereto, where the combination of digits and the connection is different for different controls, a radio transmitter connected to each of said transmitter controls for control thereby to vary the signals emitted by said transmitters, where each of said transmitters is designed to reach receivers in its own paging area, where said transmitter controls are designed to respond to signals received along a connection from said system to cause said transmitter to provide transmitted signals unique to a paging receiver in its paging area; and means connected to be reached through said telephone system programmed and designed, on receipt of information from said telephone system as to the values of a subset of digits forming part of one of a set of telephone numbers, to provide information as to the transmitter controls corresponding to paging areas associated with said one telephone number from said set and also information identifying said received subset;

means responsive to the placing on a telephone line of said system, of dialed digits representing a telephone number forming one of said set, for connecting said line through said system to said programmed means and for providing thereto information as to the value of the digit subset forming part of said number; and means responsive to the information provided by said programmed means as to paging areas, for achieving connection through the system to the transmitter controls corresponding to transmitters for paging areas associated with said represented telephone number; and means responsive to the information as to the value of said received subset to supply control signals characteristic thereof to said corresponding transmitter controls.

2. In a telephone system combined with means for paging telephone subscribers using radio transmitters effective with a localized area designed to provide, responsive to coded information, signals characteristic of said coded information and wherein paging receivers are provided for selective actuation by selective actuation by selective variants of said signals, such transmitters being associated with designated areas and being accessible through the telephone system;

means for storing, in association with each of a subset of digits information as to the telephone numbers of predetermined ones of said transmitters;

means for supplying to said storage means, the digital encoded form of a corresponding subset of digits forming part of a telephone number;

means associated with said storage means, responsive to receipt of such subset corresponding to a stored subset for signalling on the system to achieve connection of said storage means with each of the predetermined transmitters associate with said stored subset;

means associated with said storage means for providing to each said connected transmitter control signals to provide predetermined selective variants of said signals.

3. In a telephone paging system for use with transmitters effective within a localized area, controllable to provide, responsive to coded information characteristic of a paging subscriber, a radio signal for selective reception by, and actuation of, the subscriber's paging receiver, a telephone number associated with a paging subscriber, a telephone number for achieving through said system, connection to a transmitter control for controlling each transmitter; different transmitter controls having different telephone numbers;

means for storing, in association with digits identifying said associated telephone numbers, information identifying the telephone numbers of transmitter controls in predetermined localized areas characteristic of the associated telephone number;

means for supplying to said storage means, digits identifying the telephone number associated with said subscriber;

means responsive to such supply for establishing connections in the system between said storage means and the telephone controls of transmitter controls for the areas characteristic of the associated telephone number;

means for supplying, along said last-mentioned connections, coded information for causing said transmitters to transmit signals to selectively actuate the receiver of the subscriber having such identified telephone number.

4. Means for operating a telephone subscriber paging system in conjunction with a telephone system comprising:

storage means accessible through the telephone system having, for each of a plurality of series of digits forming a succeeding part of a telephone number, information identifying the dialed digits required to establish connections through the system to controllable transmitters; where the dialed digits and the established connections are different for different transmitters;

said storage means being identified with a preceding series of digits, means for connecting a line in said system to said storage means when said preceding series is signaled on said lines;

means actuable on such last-mentioned connection of said line to compare a succeeding series of digits from said line with groups of digits in said storage means to determine whether or not said succeeding series corresponds to a stored group;

means responsive to ascertainment of said correspondence to dial predetermined transmitter controls in said system and to provide to said transmitters, control information characteristic of said succeeding series of digits;

said transmitter controls being designed, in response to said control information to cause said transmitter to transmit signals characteristic of said control information.

5. For operating a telephone paging system in combination with a conventional telephone system have a plurality of transmitters designed to transmit paging signals in a plurality of paging areas, wherein different paging subscribers are paged by different paging signals, controls for said transmitters being connected to be reached through said telephone system by signaling on said system of digits of the subscriber dialed-type; different controls having different telephone numbers;

said controls being designed in response to signals received over said system, for actuating said transmitters and to be controlled to select the paging signals transitted thereby;

storage means responsive to the dialing on said system of a single paging access number for providing the designation of one or more transmitters which will broadcast a paging signal;

means responsive to said last-mentioned determination to achieve connection on said system from said responsive means to control means for said designated transmitters, and to supply signals to determine the paging signals transmitted from said transmitters.

6. A system combining radio paging service with a conventional telephone system including:

paging radio transmitters;

each paging transmitter being designed and constructed to radiate radio signals to a selected paging area; and to transmit signals adapted to selectively energize paging receivers for said signals;

controls for said paging radio transmitters;

each control for a paging radio transmitter being connected and designed to control at least one paging radio transmitter in accord with signals received by said controls;

each control being connected to said conventional telephone system to be reached by conventional connections therethrough;

different controls being reached by different connections;

wherein telephone subscribers to the radio paging system may designate different paging areas and/or different groups of paging areas;

information storage means, storing information adapted to identify paging subscribers and the paging areas which they have selected;

said information storage means being designed and constructed on receipt of digital information, to determine whether said digital information corresponds to stored information identifying a paging subscriber and, in the event of such correspondence, to provide signals indicative of the paging areas selected by the identified subscriber and signals identifying the subscriber;

means for coupling said information storage means to said conventional telephone system designed and connected so that signals of the subscriber dialed-type on a line of said conventional system can establish a first connection along said conventional telephone system to said storage means and can provide potential subscriber identifying information to said storage means;

means for coupling said information storage means to said conventional telephone system designed and connected so that: signals provided by said storage means determined by the paging areas selected by the identified subscriber establish second connections through said conventional system to each of the controls for transmitters corresponding to said selected areas to that said subscriber identifying signals provided by said storage are transmitted to such last-mentioned controls over said second connection;

said controls being connected to the conventional system and designed and constructed to control said transmitters in accord with said subscriber identifying signals received over said second connection.

7. A system combining a radio paging service with a conventional telephone system including:

paging radio transmitters;

each paging transmitter being designed and constructed to radiate radio signals to a selected paging area; and to transmit signals adapted to selectively energize paging receivers for said signals;

controls for said paging radio transmitters;

each control for a paging radio transmitter being connected and designed to control at least one paging radio transmitter in accord with signals received by said controls;

each control being connected to said conventional telephone system to be reached by conventional connections therethrough;

different ones of said controls being connected to the conventional system to be reached by different connections established by respectively different digital signals of the subscriber dialed-type;

wherein telephone subscribers to the radio paging system may designate different paging areas and a different number of paging areas;

information storage means, storing information adapted to identify paging subscribers and the paging areas which they have selected;

said information storage means being designed and constructed, on receipt of digital information, to determine whether such digital information corresponds to stored information identifying a paging subscriber, and, in the event of such correspondence, to provide signals indicative of the paging areas selected by the identified subscriber and signals identifying the subscriber;

means for coupling said information storage means to said conventional telephone system, designed and connected so that signals of the subscriber dialed-type on a line of said conventional system can establish a first connection along said conventional telephone system to said storage means and can provide potential subscriber identifying information to said storage means;

means for coupling said information storage means to said conventional telephone system designed and connected so that: signals determined by the paging areas selected by the identified subscriber provide a digital signal to establish respective second connections through the telephone system to each of the controls for transmitters corresponding to the paging areas selected by the subscriber, and so that said subscriber identifying signals provided by said storage means are transmitted to such last-mentioned controls over said second connection.